June 21, 1949.  A. B. SCHULTZ  2,474,125
VEHICLE BASED ARRESTING GEAR
Filed July 2, 1946  4 Sheets-Sheet 1

INVENTOR.
ARTHUR B SCHULTZ
BY John A. Robertson
HIS ATTORNEY.

June 21, 1949. A. B. SCHULTZ 2,474,125
VEHICLE BASED ARRESTING GEAR
Filed July 2, 1946 4 Sheets-Sheet 2
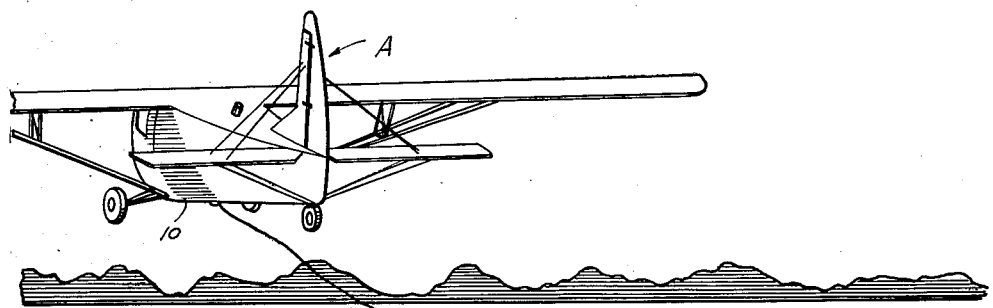
FIG. 2
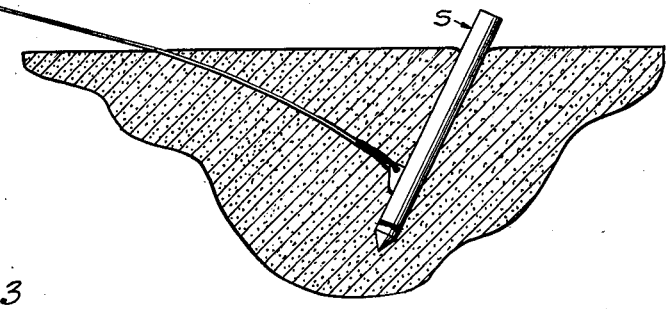
FIG. 3
INVENTOR.
ARTHUR B. SCHULTZ.
BY John A. Robertson
HIS ATTORNEY.

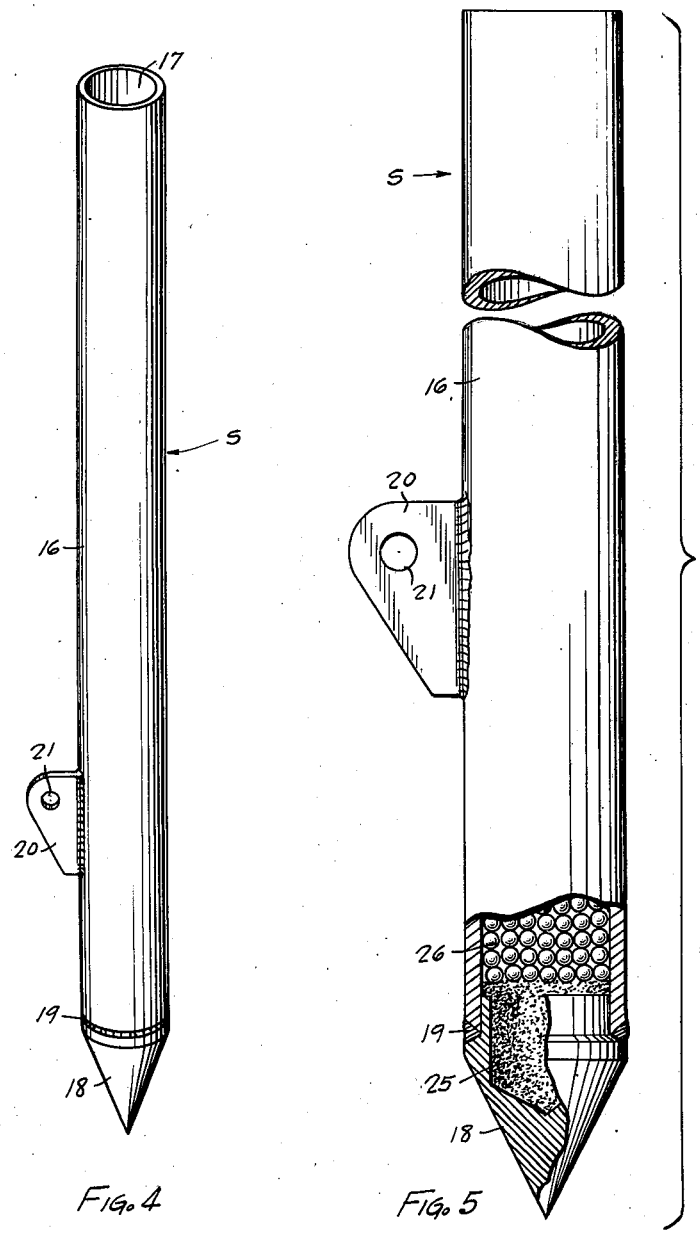

June 21, 1949. A. B. SCHULTZ 2,474,125
VEHICLE BASED ARRESTING GEAR
Filed July 2, 1946 4 Sheets-Sheet 4

INVENTOR.
ARTHUR B SCHULTZ
BY
HIS ATTORNEY.

Patented June 21, 1949

2,474,125

UNITED STATES PATENT OFFICE 2,474,125

VEHICLE BASED ARRESTING GEAR

Arthur B. Schultz, Wilmington, Del., assignor to All American Airways, Inc., a corporation of Delaware Application July 2, 1946, Serial No. 681,091

6 Claims. (Cl. 244—110)

This invention deals with the arresting of vehicles and is concerned primarily with the type of arresting gear which is based on the vehicle itself.

While the present invention will be explained in conjunction with aircraft, it is to be understood that it is equally applicable to any type of vehicle where it is desired that the vehicle itself carry the arresting gear for emergency conditions. When an aircraft comes in to make a landing or takes off and things go as they should, there is no need for emergency arresting apparatus. The devices on the aircraft usually employed for slowing it down such as the wheel brakes and/or the propellers are sufficient for the ordinary operations. When things do not go according to schedule and an emergency arises, it becomes desirable to provide apparatus on the aircraft for bringing it to a stop in such a manner as to not damage the aircraft itself or cause injury to the personnel. This means that there must be a gradual deceleration of the aircraft.

Following this theory, there has been proposed an arrangement in which an appropriate length of a line made from nylon or a comparable synthetic plastic fiber in its undrawn condition has one end anchored to the aircraft. The other end of this line is intended to be anchored to the ground by devices carried on the aircraft. When the anchorage is achieved the line of undrawn nylon or other synthetic plastic fiber functions to gradually decelerate the plane. This line elongates and as it elongates absorbs the energy of deceleration.

With the foregoing conditions in mind, this invention has in view, as its foremost objective, the provision of new and improved means for effecting a ground anchorage. Following this objective, the invention has as a further and more detailed object the provision of means which is adapted to be carried by an aircraft or other moving vehicle for effecting an anchorage with the ground and which means includes as essential elements a spike to which the line is connected and which is adapted to be driven into the ground surface together with means for driving the spike.

Yet another object of the invention is the provision, in apparatus of the character aforesaid, of mechanism for driving the spike under the influence of an explosive charge. Various other more detailed objects and advantages of the invention are tied up with this feature of driving the spike by an explosive charge.

In order to effect an anchorage with the ground which will do the job required of it, namely, hold the end of the line during the arresting operation, it is highly important that the spike be driven in such a manner and also be so affected by the tension of the line as to not pull out of the ground. To the end of achieving the desired result, the line must be connected to the spike at an appropriate point. Accordingly, a further object of the invention is the provision, in arresting apparatus of the character indicated, of a ground spike having means for securing a line thereto at a point slightly spaced from the point or nose of said spike.

These and other detailed objects and advantages will in part become apparent and in part be hereinafter stated as the description of the invention proceeds.

The invention therefore comprises apparatus designed for use in vehicle based arresting gear and which consists of a ground engaging spike, means for driving the spike under the influence of an explosive charge, and a connection for a decelerating line appropriately located with respect to the point of the spike.

For a full and more complete understanding of the invention reference may be had to the following description and accompanying drawings wherein:

Figure 2 is another perspective showing the relative position of the aircraft, the line, and the spike after penetration.

Figure 3 is a detailed showing taken as a section through the ground, bringing out the position of the spike and line relative to the ground.

Figure 4 is a detailed perspective of the spike per se.

Figure 5 is a side view, partly in section and partly in elevation showing the spike on an enlarged scale and broken away.

Figure 1:
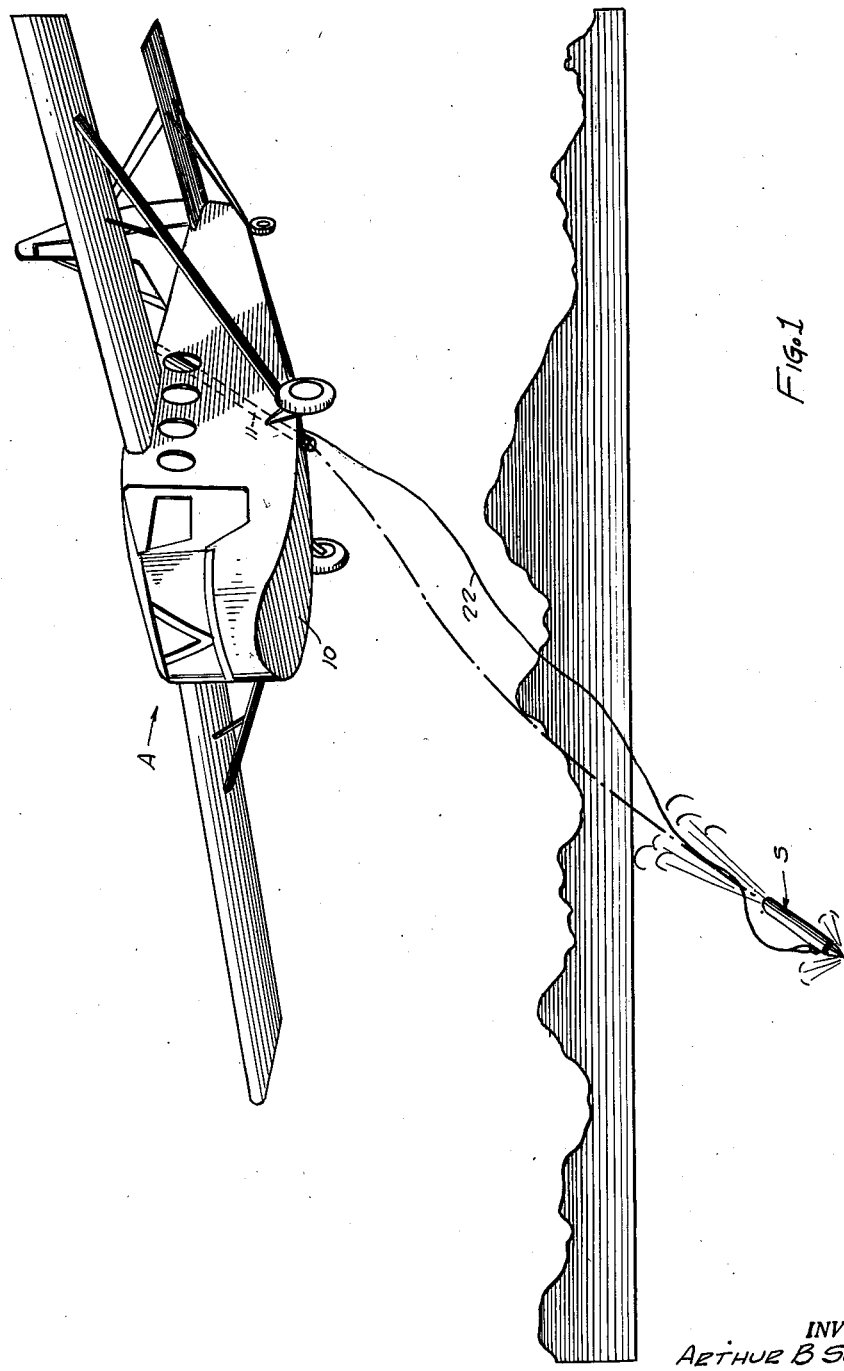
Figure 1 is a perspective view showing the present invention as applied to an aircraft and illustrating the position of the spike after it is fired and as it is about to penetrate the ground.

Referring now to the drawings, wherein like reference characters denote corresponding parts, and first more particularly to Figure 1, the present invention is shown as applied to an aircraft which is referred to in its entirety by the reference character A. Obviously, the aircraft may be of any type and regardless of the type of aircraft, it will in all instances include a fuselage 10 or other body structure which is adapted to have the arresting gear of this invention applied thereto.

Figure 6:
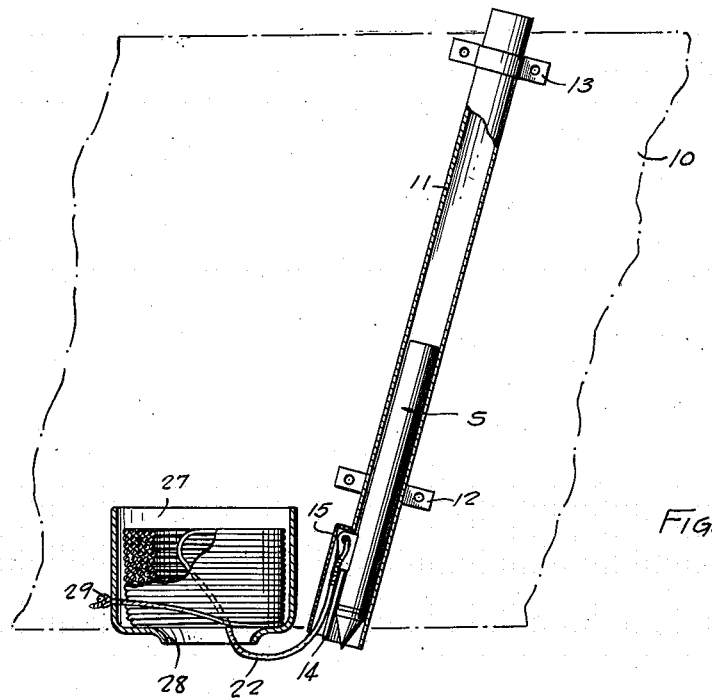
Figure 6 is a detailed side view largely in section showing the apparatus which is mounted on the aircraft for driving the spike. This view also develops the manner of packaging the decelerating line and, Figure 7 is a detailed perspective of the tubular guide for the spike.

Referring now more particularly to Figure 6, a tubular guide 11 is shown as being rigidly secured to the fuselage 10 by brackets 12 and 13. It will be noted that the tube 11 assumes a position in which it is inclined forwardly from the vertical. As this tube 11 acts as the guide for the spike which is to be driven, the inclined position allows for the forward speed of the aircraft and insures that the spike will hit the ground with proper angular relation with respect thereto.

Figure 7:
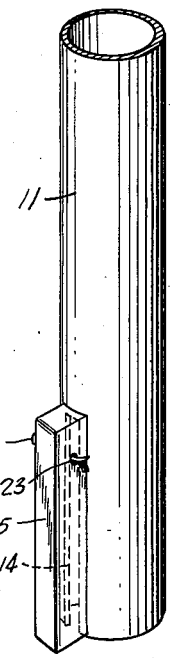

Referring now to Figure 7 in conjunction with Figure 6 it will be noted that the lower forward end of the tube 11 is formed with a slot 14 which is covered by a housing 15 which is open at the bottom.

While it is possible to drive a spike with either the well-known "Bazooka" or "Davis gun" the invention has particularly in mind the use of a Donnerkiel gun because the latter has certain attributes which particularly are adapted to the present usage. In a Donnerkiel gun the charge and the reaction mass are carried in the projectile itself.

Referring now more particularly to Figures 4 and 5, a Donnerkiel gun in the form of a spike is there illustrated. The spike is referred to in its entirety by the reference character S and comprises a tubular body portion 16 of generally cylindrical formation. This tubular body portion 16 is open at the top as indicated at 17 and closed at the bottom by a pointed nose 18 which is of a more solid construction and secured to the body portion 16 by the welded joint indicated at 19. The tubular portion 16 of the spike S carries an ear 20 formed with an opening 21. This ear 20 projects through the slot 14 of the tube 11 into the housing 15. A decelerating line 22 (see Figure 6) has one end secured to the ear 20 through the medium of the opening 21. In order to hold the spike S in position in the tube 11, the housing 15 has its opposite side walls provided with aligned openings 23 and a frangible cotter pin 24 is passed through these aligned openings beneath the ear 20. The force which drives the spike breaks the cotter pin 24.

The explosive charge which drives the spike S is shown at 25 in Figure 5. This charge may be gun cotton, gunpowder or any other explosive capable of producing the desired results. A reaction mass 26 is positioned in the tubular body 16 against the explosive charge 25.

In order to properly decelerate the aircraft A in a gradual manner so as not to damage it or cause injury to personnel, it is necessary to employ, as the decelerating line 22, a line which is capable of drawing or elongating and while so elongating absorb energy. Nylon in its undrawn condition has been found to be suitable for this purpose. There are other synthetic plastic fibers which also may be used in their undrawn state to achieve the desired results. Among these might be mentioned polyethylene, vinyon, and vinylite. The particular line will be so designed as to diameter and length as to fit the requirements of the particular plane in which it is installed. These requirements will involve the weight of the plane and the speed at which it is flown in landing.

In any event it is important that the line be so arranged that it may pay out easily when the spike is driven. To this end the fuselage 10 is shown as being provided with a container 27 which is intended to receive the line in a coiled condition. It will be noted that the lower end of the container 27 is provided with a large flared opening 28 through which the line pays out. As above pointed out, one end of the line 22 is secured to the ear 20. The other end which is represented at 29 is anchored to the structure of the aircraft A at an appropriate point.

While the mode of operation of the above described apparatus is believed to be obvious, it may be briefly outlined by noting that under ordinary flying conditions, the arresting device hereof is not employed. It is intended to be used only for emergencies. Should the pilot be confronted with immediate danger, he may quickly bring the plane to a stop in a very short distance by merely setting off the explosive charge 25. This is preferably done by closing an electric circuit, the control switch of which will be located conveniently accessible to the pilot. As the charge goes off the reaction mass 26 passes upwardly through the tubular body portion 16 and out through the tubular guide 11 to the atmosphere above the plane. The guide 11 serves to confine the reaction mass and prevent injury to the aircraft. At the same time the spike S is driven forwardly and downwardly. Due to the force with which it is driven, it will penetrate the ground as shown in Figures 2 and 3. As it penetrates, the line 22 cuts through the ground to assume a position substantially normal but slightly in excess of a right angle with respect to the spike S. Thus, the continued pull which is exerted on the line 22 by the aircraft A tends to cause the spike to dig further into the ground rather than being withdrawn therefrom. As the aircraft A moves forwardly and downwardly the line 22 draws and absorbs the energy which is created incidental to the decelerating of the aircraft A. Obviously the line 22 will have to be replaced with a new undrawn line after each usage.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. In vehicle based arresting apparatus, means for effecting a ground anchorage comprising a tubular guide adapted to be mounted on the vehicle to be arrested, said guide being formed with a slot at its lower end, a ground engaging spike in said tubular guide, a connecting element in the form of an ear on said spike and received in said slot, said ear being adapted to have a decelerating line attached thereto, and an explosive charge for driving said spike.

2. In vehicle based arresting apparatus, means for effecting a ground anchorage comprising a ground engaging spike consisting of a tubular body member closed at one end by a pointed nose, an explosive charge in said tubular body member adjacent to said nose, a reaction mass in said tubular body member engaging said explosive charge, and a connecting element carried by said tubular body member at a point spaced a slight distance from said nose, said connecting element being adapted to have a decelerating line connected thereto.

3. In combination, an aircraft having a fuselage, a tubular guide carried by said fuselage in a forwardly inclined position, the lower forward end of said guide being slotted, a housing enclosing said slotted portion, a container carried by said fuselage, a decelerating line packaged in said container, a ground engaging spike consisting of a tubular body member and a pointed nose, said spike being positioned in said tubular guide, an ear on said spike received in said slot and enclosed by said housing, one end of said decelerating line being connected to said ear, an explosive charge in said spike adjacent to said pointed nose, and a reaction mass positioned against said explosive charge.

4. In an aircraft based arresting apparatus, means for effecting ground anchorage comprising a tubular guide open below and above the body of an aircraft on which it is mounted, a hollow spike in said tubular body, a pointed nose on said spike to promote ground penetration, an explosive charge in said spike, a reaction mass in said spike engaging said explosive charge, line connecting means formed above said nose, and a line of elongatable material adapted to absorb shock while elongating coupled to said last-named means.

5. In an aircraft based arresting apparatus, means for effecting a ground anchorage comprising an elongated tubular guide adapted to be mounted on the aircraft which is to be arrested with one end opening above and the other below the aircraft body, a hollow spike body closed at its tip in said guide, an explosive charge in said spike above the tip for driving the same into the ground, and a reactive mass in said spike back of said explosive charge.

6. In an aircraft based arresting apparatus, means for effecting ground anchorage comprising a tubular guide open below and above the body of an aircraft on which it is mounted, a hollow spike in said tubular body, a pointed nose on said spike to promote ground penetration, an explosive charge in said spike, a reaction mass in said spike engaging said explosive charge, line connecting means formed above said nose, and a line of permanently elongatable undrawn synthetic plastic fibers adapted to absorb shock while elongating coupled to said last-named means.

ARTHUR B. SCHULTZ.

REFERENCES CITED

The following references are of record in the file of this patent:

UNITED STATES PATENTS

| Number | Name | Date |
| --- | --- | --- |
| 1,108,715 | Davis | Aug. 25, 1914 |
| 1,957,285 | Oehmichen | May 1, 1934 |

FOREIGN PATENTS

| Number | Country | Date |
| --- | --- | --- |
| 361,720 | Great Britain | Nov. 26, 1931 |
| 533,475 | France | Dec. 10, 1921 |
| 589,723 | Great Britain | Feb. 27, 1925 |